United States Patent [19]

Hodge

[11] Patent Number: 5,570,535

[45] Date of Patent: Nov. 5, 1996

[54] SQUEEZE MOUNT GUIDE RING

[76] Inventor: Frederick Hodge, 4872 Victoria Chase Ct., Jacksonville, Fla. 32257

[21] Appl. No.: 327,604

[22] Filed: Oct. 24, 1994

[51] Int. Cl.⁶ .................................................... A01K 87/04
[52] U.S. Cl. ............................................................ 43/24
[58] Field of Search .................................................... 43/24

[56] References Cited

U.S. PATENT DOCUMENTS

| | | | |
|---|---|---|---|
| 2,561,675 | 7/1951 | Ross | 43/24 |
| 2,596,835 | 5/1952 | Benge | 43/24 |
| 3,099,889 | 8/1963 | Verneuil | 43/24 |
| 5,177,892 | 1/1993 | Ohmura | 43/24 |
| 5,417,007 | 5/1995 | Stotesbury | 43/24 |

FOREIGN PATENT DOCUMENTS

| | | | |
|---|---|---|---|
| 1362077 | 4/1964 | France | 43/24 |
| 1450526 | 7/1966 | France | 43/24 |
| 1480284 | 4/1967 | France | 43/24 |
| 0411109 | 7/1945 | Italy | 43/24 |
| 0383490 | 4/1938 | Japan | 43/24 |
| 0313692 | 8/1969 | Switzerland | 43/24 |

*Primary Examiner*—Richard K. Seidel
*Assistant Examiner*—James Miner

[57] ABSTRACT

A replacement or originally mounted guide ring for fishing poles and rods that can be affixed by squeezing the upper half causing the lower half to expand and upon release return to a predetermined circular measurement commensurate with the size of the pole or rod being outfitted with the squeeze mount guide ring. The size of the upper guide ring and the predetermined circular measurement of the lower half bottom can vary in size.

5 Claims, 2 Drawing Sheets

SQUEEZE MOUNT GUIDE RING

BACKGROUND OF THE INVENTION

1. Field of the Invention

The present invention is a device for assembling to fishing poles as a replacement or originally installed fishing line guide. More specifically, the present invention will be used to quickly and easily replace broken or damaged guide rings on fishing poles.

2. Prior Art

Fisherman have always lost guide rings from their fishing poles, causing the pole to become less efficient and incapable of properly guiding fishing line while being casted or retrieved.

Existing art for guide ring replacements are cumbersome and very time consuming to mount to a fishing pole. Prior art requires the use of nylon sting and glue to mount a guide ring to a fishing pole.

No device is presently known that will enable a fisherman to quickly and securely replace a broken or damaged guide ring to fishing poles.

SUMMARY OF THE INVENTION

The primary objective of the present invention is to provide a device for use by fisherman that will enable them to quickly replace a broken or damaged fishing pole guide ring in an effective and secure manner without any required expertise or special equipment.

It is also an object of the present invention to provide a device which is simple to mount to a fishing pole and relatively inexpensive.

Another object is to provide a single device that requires no other attachable devices to securely fasten it to the fishing pole.

A further object is to provide such a devise in a material that is resistant to corrosion; often time caused by exposure to moisture and salt water.

The foregoing objects can be accomplished by providing a device with a guide ring mounted between two pieces of "S" shaped prestressed metal crossing each other with one in the reverse position. In the preferred embodiment of the invention, the "S" shaped sections of the device is flat width a reduced with in the center section where the two sections cross. With exception of the reduced width cross sections a standard continuous width would be maintained. On the upper portion of the crossed "S" shaped sections solidly weld a guide ring made of comparable non corrosive material. The connection at top of the cross sections creates support for the cross sections, allowing the prestressed resilient metal to create a figure. "8" with a non connecting circular opening on the bottom half. The guide ring is position high enough up from the cross section to allow the two prepositioned "S" shaped flat section to slide by each other in the reduced width section when sufficient pressure is applied simultaneously to the upper half of the invention below the spot welds. The application of pressure to the upper section causes the bottom half of the invention to expand and upon release of the pressure it retract to its preformed size. The size of the invention can be as varied as there are pole sizes. The fisherman can make the appropriate judgement as to which size squeeze mount guide ring to use.

DETAILED DESCRIPTION

Figure 1:
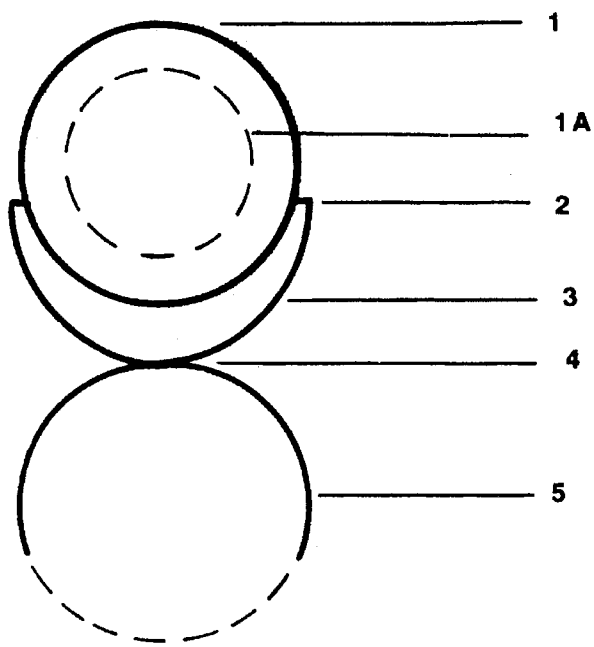
FIG. 1 is a flat view of a squeeze mount guide ring device depicting an optional plastic insert in accordance with the present invention.

As shown in the drawings, the squeeze mount guide ring in accordance with the present invention comprises two "S" shaped pieces of metal crossed one in the reverse position with resilient qualities and a guide ring. The "S" shaped flat strips of metal is of a consistent width except at the point 4 where they cross.

Figure 4:
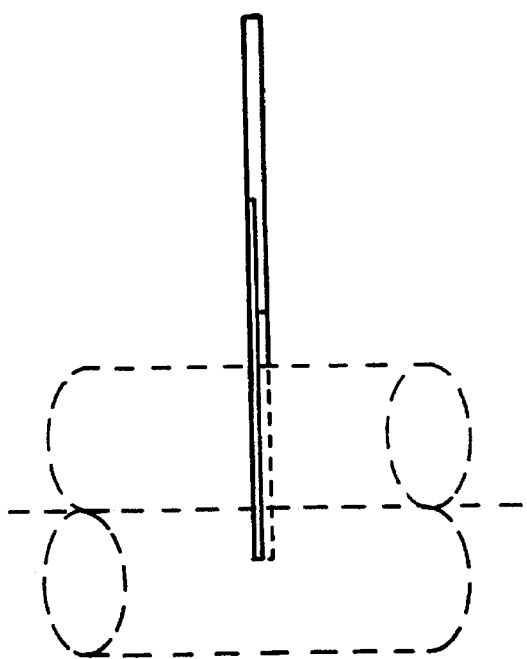
FIG. 4 is a side view with a recommended standard width.

The cross over section 4 is of reduced width to allow for smooth movement upon applying pressure and to maintain an approximate overall standard width of 5 millimeters; best seen in FIG. 4.

Figure 3A:
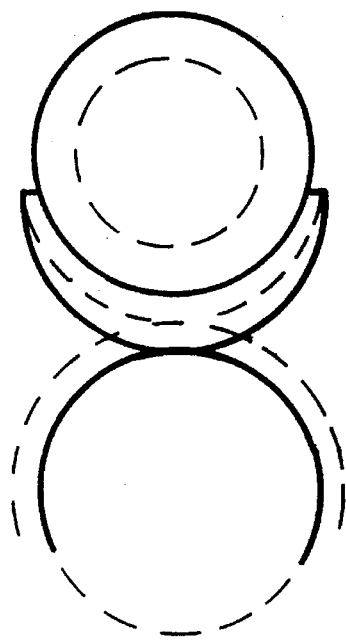
FIG. 3A–3C are front view's, depicting expansion and resilient attributes.
Figure 3B:
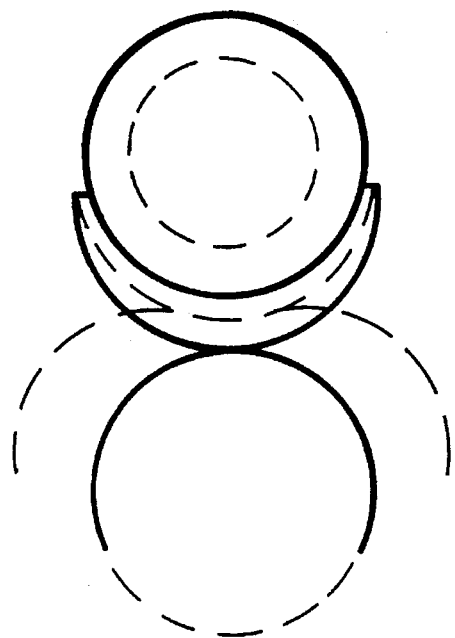
Figure 3C:
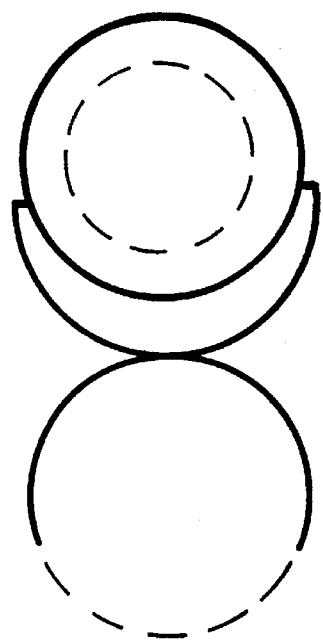

Guide ring i is solidly weld 2 between the upper half of the two crossed "S" shaped pieces. The ring, formed from a non corroding type of metal is affixed high enough up from the cross over section to allow for a range of expansion movement when pressure is applied inward at 3. As seen in FIG. 3, positioning the guide ring so that at least half of the ring is above the point of the spot welds ensures that the ring will not prohibit the intended maximum sliding movement of the device when pressure is applied at 3.

Figure 2:
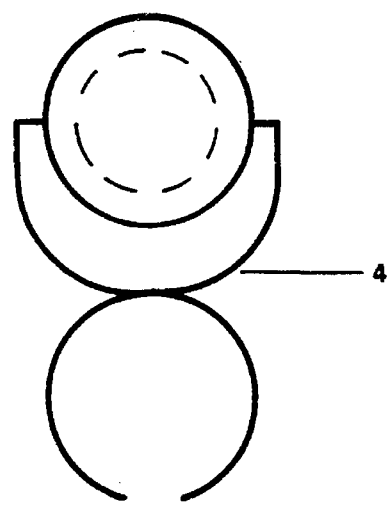
FIG. 2 is an enlarged two dimensional fiat view of the device.

As best seen in FIG. 2, the reduced with at the cross over section is gradually reduced through the bend in the "S" shaped sections. The bottom half 5 while not touching is preformed so that it maintains a circular measurement. A thin gage strong stainless steel such as 177 or spring steel is the preferable material. With the lower half maintaining a circular measurement it allows for manufacturing the squeeze mount guide ring to fit a fishing pole/rod of any diameter. Using a material with resilient qualities would ensure a tight upright and stable fit which could be supplemented with glue if desired, see FIG. 4.

The optional plastic insert 1A preferable of a durable harden plastic material will reduce the fraying of line during casting and retrieving. This insert is pre sized to fit the guide ring and molded in such a manner that it can be inserted by applying moderate pressure with the hands.

Pre determined diameters of the upper guide ring to be used and the pole to be fitted allows the device to be constructed for various size fishing pole and is idea for a mass production process. The simple stand alone construction of the device will allow the average fisherman who breaks or damages a fishing pole guide ring to quickly and securely replace it by applying moderate pressure with the hands or a set pliers.

I claim:

1. A fishing rod guide ring device for mounting on a fishing rod and guiding a fishing line, said guide ring device comprising a metal ring for supporting the passage of a fishing line, said metal ring having an outside circumferential surface, said guide ring device further comprising an insert mounted within said metal ring for reducing fraying of said fishing line, said guide ring device comprising two crossed S-shaped pieces of thin gage resilient material, each of said pieces having an upper half adjacent first ends of said pieces, each of said pieces having a lower half adjacent second ends of said pieces, said first end of each of said pieces being fixedly connected to substantially opposite sides of said outside circumferential surface, whereby said guide ring device is mounted on said fishing rod by squeezing said two upper halves together so as to resiliently separate said two lower halves thereby allowing mounting of said guide ring device on said fishing rod.

2. A fishing rod guide ring device as set forth in claim 1 wherein the insert is constructed of plastic material.

3. A fishing rod guide ring device as set forth in claim 1 wherein each of said S-shaped pieces further comprises a portion of reduced width at a center section of said S-shaped pieces.

4. A fishing rod guide ring device as set forth in claim 1 wherein the S-shaped pieces are constructed of non-corrosive material.

5. A fishing rod guide ring device as set forth in claim 1 wherein the metal ring is constructed of non-corrosive material.

\* \* \* \* \*